Sept. 5, 1944. J. J. ELIAS 2,357,639
AUTOMATIC DENSITY TESTER
Filed July 6, 1942
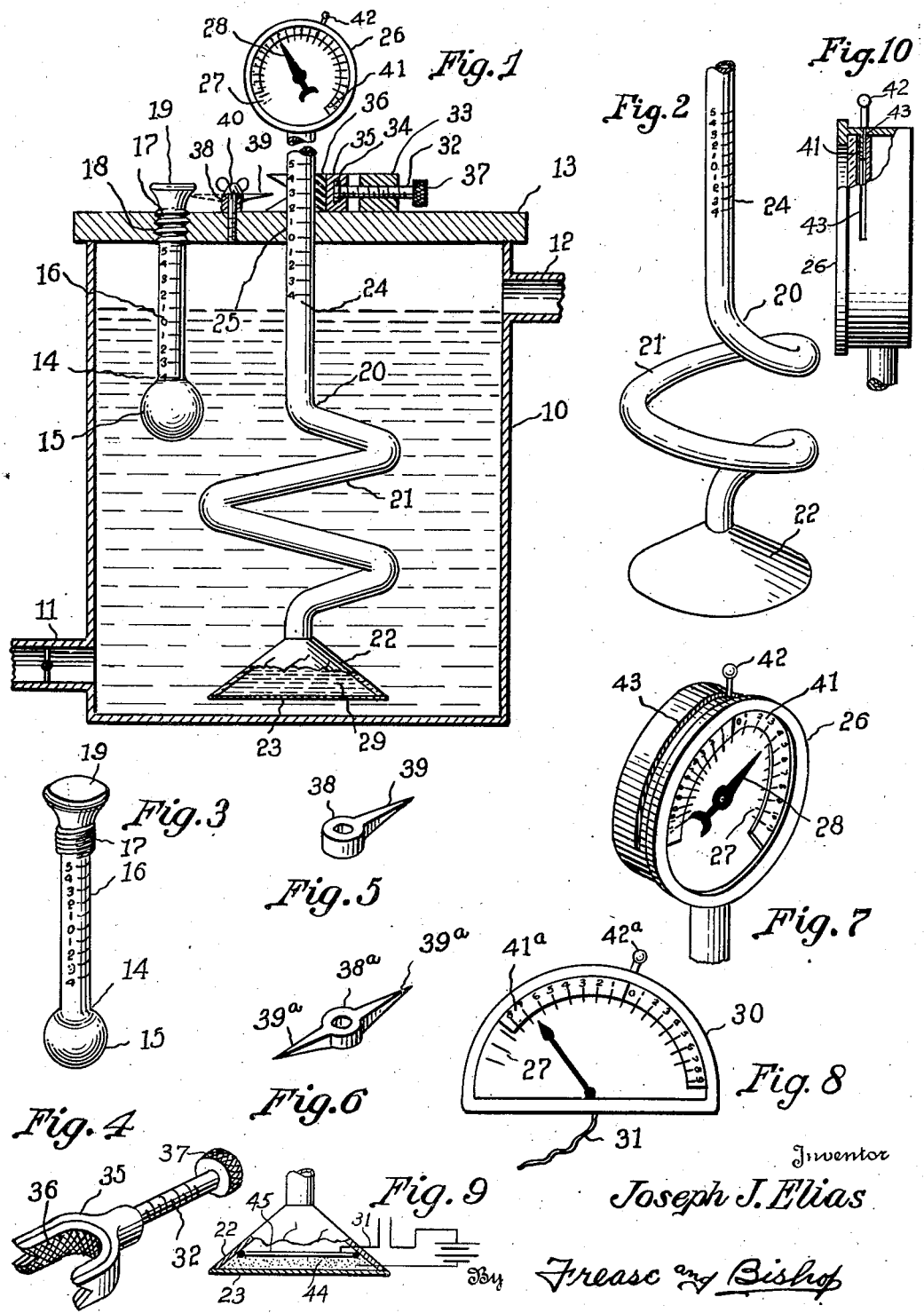
Inventor
Joseph J. Elias
By Freasc and Bishop
Attorneys Patented Sept. 5, 1944

2,357,639

UNITED STATES PATENT OFFICE 2,357,639

AUTOMATIC DENSITY TESTER

Joseph J. Elias, Canton, Ohio

Application July 6, 1942, Serial No. 449,887

3 Claims. (Cl. 265—44)

The invention relates to a device for instantly, accurately and automatically determing the density of liquid solutions and more particularly to such an automatic density tester which will indicate the densities of solutions at a glance, thereby eliminating all slow and tedious manual processes.

It is necessary in many industrial operations, chemical plants and other uses that an operator be constantly advised as to the specific gravity or density of various liquids. Such devices as are now in use for indicating the density of liquids require tedious manual processes and furthermore are not entirely accurate as they do not provide any means to compensate for the differences in temperature as well as for the difference in the coefficient of expansion between the solution to be tested and the material of which the tubing carrying the diaphragm is formed.

Moreover, it is well known that water varies in density in different localities so that each solution has its own specific density, and such density testers as are now in use provide no means for determining and compensating for these differences.

It is therefore an object of the present invention to provide an automatic density tester which will instantly, accurately and automatically determine variable densities of solutions so that the density may be read at a glance thus eliminating all slow and tedious manual processes.

Another object is to provide a density tester having means for determining and compensating for differences in density of water in various localities.

A further object is to provide a density tester including a coiled tube having a diaphragm connected thereto and communicating with a gauge, the coils in the tube compensating for differences in temperature as well as for the difference in the coefficient of expansion between the solution to be tested and the material of which the coiled tubing is formed.

A still further object is the provision of a density tester including a calibrated float serving as a tester for the entire unit, to determine the correct adjustments to be made on the calibrated coiled tube so as to enable the device to give accurate readings of the solution to be tested.

Another object of the invention is the provision of a gauge in the form of any standard fluid or electrical gauge to give density readings of solutions to be tested, novel means being provided for determining the zero mark on the gauge.

Still another object is the provision of a novel indicator by means of which the hollow coiled unit may be accurately adjusted to conform to the reading on the float.

A further object of the invention is the provision of a set screw having a padded, arc-shaped portion for holding the hollow coiled unit in adjusted position.

The above objects together with others which will be apparent from the drawing and following description, or which may be later referred to, may be attained by constructing the improved automatic density tester in the manner hereinafter described and illustrated in the accompanying drawing, in which—

Figure 1 is a vertical sectional view through a tank containing liquid and provided with the improved automatic density tester to which the invention pertains;

Fig. 2, a detached perspective view of the hollow coiled unit;

Fig. 3, a similar view of the calibrated float;

Fig. 4, a perspective view of the improved set screw for holding the hollow coiled unit in adjusted position;

Fig. 5, a perspective view of the pivoted, single pointed indicator;

Fig. 6, a perspective view of an alternate form of double pointed indicator;

Fig. 7, a perspective view of the fluid gauge adapted to be connected to the hollow coiled unit;

Fig. 8, a front elevation of an alternate form of electric gauge which may be substituted for the fluid gauge;

Fig. 9, a fragmentary sectional view of the bell of the density testing tube showing the same arranged for connection to an electric gauge; and Fig. 10, a side elevation, partly in section, of the fluid gauge, showing the means for adjusting the calibrated member therein.

Similar numerals refer to similar parts throughout the drawing.

A tank or other receptacle containing the liquid to be tested is indicated generally at 10, and is provided with an inlet port 11, which may be located near the bottom of the tank, and an outlet port 12, which may be located near the top of the tank and preferably at the opposite side from the inlet. The lid or cover 13 of the receptacle supports all of the mechanism comprising the improved automatic density tester.

For the purpose of determining the correct adjustments that must be made in the device a calibrated float, indicated generally at 14, is provided and may comprise the ball 15 with the calibrated upright neck 16, having screw threads 17 near its upper end for screwing the float into the internal threads 18, in the cover 13, when the float is not in use, a knob 19 being provided at the top of the float for manipulating the same.

This float may be formed of any suitable light material such as copper, aluminum, hard rubber, glass, etc., depending upon the chemical reaction upon the float by the particular solution to be tested.

The hollow coiled unit, indicated generally at 20, forms a principal part of the automatic density tester and comprises the coiled portion 21, adapted to compensate for variations in temperature as well as the difference in the coefficient of expansion between the material of the coiled unit and the solution to be tested. This coiled unit may be made of any light material similar to that of which the float is formed.

Regarding the coiling of the tube 20, as indicated at 21, on the drawing, this is to compensate for variations in temperature as well as the difference of the coefficient of expansion between the metal of the tube and the solution to be tested. This coil might be dispensed with as every reading of the instrument may be accompanied by taking the temperature of the solution at the instant of testing. When density readings are taken in industrial tests the temperature of the liquid to be tested is specified and density corrections are made for standard temperatures. The coiling of the tube has been provided in order to eliminate some of this procedure. Explaining the reason for the coil, when any change in temperature occurs in the solution to be tested the bell and tube containing the transmitting medium, oil or carbon granules, changes in total length, if the solution gets warmer the bell goes deeper into the solution being tested and the coil releases like the folds of an accordion when pulled from either end because the tube gets longer by virtue of its coefficient of expansion. The deeper the bell sinks into the solution the more it automatically compensates for lesser density effected by the heat of the solution being tested. The formula $D \times d = P$ (Depth times the density equals total pressure) explains the action. For any cooling of the solution to be tested it works in the same way but in the opposite direction, like the folds of an accordion contracting when pressed from either side. The colder the solution, the denser it is, thus causing the bell to rise by the contraction of the coil.

Because liquids in general have a higher rate of change due to any temperature difference than metals, a rough calculation will show that a length of tubing equal to the height of the tester will not expand or contract enough to compensate for the temperature change in the solution being tested. Hence the spiral coil is utilized to realize a sufficient length of tubing in a restricted or limited space to compensate for the changes in temperature of the solution being tested. The greater the length of the tube the more total change in length is realized for any fixed temperature difference in the solution being tested. For instance, a tube two inches long will expand twice as much as a tube one inch long for every degree of temperature change. The right length for any given depth of vat holding the solution to be tested can be calculated to create a coil to compensate for any changes in temperature and still give correct readings of density of the solution being tested.

A bell 22 is formed at the lower end of the coiled unit, the mouth of which is covered by a diaphragm 23 which may be formed of any suitable flexible material depending on the chemical reaction upon it by the solution to be tested.

Above the coil 21 the coiled unit is provided with the straight, vertical, calibrated portion 24 slidably located through a suitable aperture 25 in the cover 13 and provided at its upper end with a gauge, which may be any standard fluid or electrical gauge, provided with the improved attachment which will be later described.

As shown in Figure 1 a standard fluid gauge 26 is provided having the annular calibrations 27 and the usual pivoted indicating hand 28. In conjunction with the fluid gauge shown in Figure 1 a nonvolatile oil of not more than .4 density may be used in the hollow coiled unit, upon the diaphragm as indicated at 29.

If it is desired to use a standard electrical gauge as indicated generally at 30, in Fig. 8, carbon granules 44 may be used in the coiled unit as shown in Fig. 9 instead of the nonvolatile oil, these carbon granules resting on the diaphragm and having a metal plate 45 resting thereon and connected to a wire 31 which leads to a battery and to the ammeter type gauge 30, as in usual and well known practice.

For the purpose of holding the hollow coiled unit 20 in adjusted position a set screw 32 is provided being threaded through a lug, or bracket 33, upon the top of the cover 13, and having its inner end swivelled, as at 34, to an arc-shaped portion 35, provided with a pad 36 of rubber, leather, or other soft material so that it will not injure the calibrated neck of the coiled unit. A knurled head 37 may be provided upon the set screw for manually operating the same.

An indicator, shown generally at 38, is mounted upon the cover, between the float and the hollow coiled unit, for the purpose of adjusting the coiled unit so that the calibrations thereon conform to those on the float. This indicator may have a single point 39 as shown in Figs. 1 and 5 and may be swivelled upon the lid as indicated at 40 so as to be turned in either direction, or as shown in Fig. 6 the indicator 38a may have two oppositely disposed points 39a and may be rigidly mounted upon the lid with one point directed toward the float and the other toward the hollow coiled unit.

In using the improved density tester the specific gravity of the water in the particular locality must first be determined. This may be accomplished by filling the receptacle 10 with the water to be used in the solution after which the float 14 is unscrewed and permitted to float freely in the water.

The hollow coiled unit 20 is then adjusted through the opening 25 in the lid so that the calibrations thereon coincide with the calibrations upon the float, after which the set screw 32 is tightened to hold the hollow coiled unit in adjusted position. The float may then be screwed back in place in the lid as there is no further use for the same. The zero point may then be determined upon the gauge 26 or 30 by swinging the calibrated, pivoted, arcuate member 41 or 41a to the proper position by sliding the knob 42 through the slot 43, to indicate the zero position.

The device is then ready for use for testing any solution which may be placed in the receptacle 10. In order to make a density test it is only necessary to close the inlet valve, which is preferably a butterfly valve as shown, and a reading may be immediately obtained upon the meter, instantly and accurately indicating the density of the solution.

The improved density tester thus eliminates all tedious manual processes of reading the densities of solutions and automatically affords instant, accurate readings as often as may be desired, thus saving time, labor and expense.

I claim:

1. In combination with a receptacle for containing a liquid whose density is to be tested, a cover for the receptacle provided with an opening, an automatic density tester including a tube having a straight, upright, calibrated upper portion adjustably located through said opening and a coiled portion immersed in the liquid to be tested, an indicating pointer on the cover adjacent to the tube for cooperating with the calibrations on the tube to indicate the adjustment of the tube, a screw operated yoke mounted on the cover adjacent to said opening and having a pad contacting the tube for locking the tube in adjusted position, an indicating gauge connected to the upper end of the tube, a bell upon the lower end of the tube submerged in the liquid, a diaphragm covering the mouth of the bell and means for maintaining the level of the liquid at a constant level.

2. In combination with a receptacle for containing a liquid whose density is to be tested, a cover for the receptacle provided with an opening, an automatic density tester including a tube having a straight, upright, calibrated upper portion adjustably located through said opening and a coiled portion immersed in the liquid to be tested, an indicating pointer on the cover adjacent to the tube for cooperating with the calibrations on the tube to indicate the adjustment of the tube, a screw operated yoke mounted on the cover adjacent to said opening and having a pad contacting the tube for locking the tube in adjusted position, an indicating gauge connected to the upper end of the tube, an adjustable, arcuate calibrated member on said gauge, there being an arcuate slot in the gauge, a knob upon the arcuate calibrated member located through said slot for adjusting said calibrated member to correspond to the adjustment of the tube, a bell upon the lower end of the tube submerged in the liquid, a diaphragm covering the mouth of the bell and means for maintaining the level of the liquid at a constant level.

3. In combination with a receptacle for containing a liquid whose density is to be tested, a cover for the receptacle provided with an opening, an automatic density tester including a calibrated tube adjustably located through said opening and a coiled portion of the tube immersed in the liquid to be tested, an indicating pointer on the cover adjacent to the tube for cooperating with the calibrations to indicate the adjustment of the tube, means for locking the tube in adjusted position, an indicating gauge connected to the upper end of the tube, a bell upon the lower end of the tube submerged in the liquid, a diaphragm covering the mouth of the bell, and means for maintaining the level of the liquid at a constant level, said coiled portion of the tube responding to changes in temperature of the liquid by moving the bell and thus compensating the density readings for the change in temperature.

JOSEPH J. ELIAS.